H. S. PARMELEE.
Fire-Extinguisher.
No. 8,376. Reissued Aug. 13, 1878.
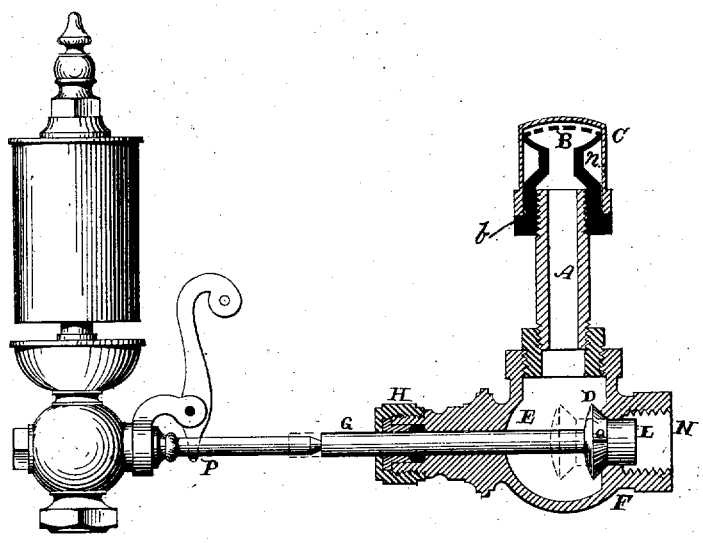
WITNESSES:
Joseph A. Miller Jr.
William H. Roop.
INVENTOR
Henry S. Parmelee
by Joseph A. Miller
Attorney

UNITED STATES PATENT OFFICE

HENRY S. PARMELEE, OF NEW HAVEN, CONNECTICUT.

IMPROVEMENT IN FIRE-EXTINGUISHERS.

Specification forming part of Letters Patent No. 156,374, dated October 27, 1874; Reissue No 6,257, dated January 26, 1875; Reissue No. 8,376, dated August 13, 1878; application filed June 21, 1878.

*To all whom it may concern:*

Be it known that I, HENRY S. PARMELEE, of the city and county of New Haven, and State of Connecticut, have invented a new Improvement in Fire-Extinguishers; and I do hereby declare that the following is a full, clear, and exact description thereof, reference being had to the accompanying drawings, forming part of this specification.

The drawing represents one of my improved distributers mounted on a branch pipe and protected by a metal cap, with the valve in sectional view, and the valve-stem and the alarm steam-whistle in view.

This invention relates to an improvement in a fire-extinguisher for which Letters Patent were granted to me August 11, 1874, parts of which are applicable to other purposes; and it consists, first, in a distributer arranged to spread the liquid over a large surface, mounted on a branch pipe of smaller diameter than the main pipe, to which it is secured, and protected by a metallic cap; second, in the novel arrangement by which the metallic cap is secured to the distributer at or near its base by a solder or material fusible at a low temperature, or at such a degree of heat as will insure the melting of the securing material at any desired temperature above the normal temperature of a room or other place where the distributer is situated; third, in the construction of the valve which actuates the alarm so as to extend below the valve-opening, and thereby hold the opening closed until the valve shall have moved its length, whereby an increased movement is given to the valve to act upon the alarm before the full flow of water is attained.

A is the branch pipe or tube to which the water-distributer B is attached. Over the distributer the cap C is loosely fitted so as to completely cover and protect the same. The cap C, I usually secure to the base or other portion of the distributer least affected by the cooling influence of the water in the pipe by a solder or material fusible at a degree of temperature of, say, 120°, but so as to make a tight joint and prevent the escape of water, gas, or whatever it may contain. In order to prevent the water from flowing freely upon the fusible material, I construct the cap so as to fit closely some portion of the distributer above the base or above the fusible material, so that but little water can reach the fusible material until the cap has been loosened by heat, and such water cannot materially retard the fusion of the material and the prompt release of the cap.

It is desirable to remove the soldered joint by which the cap is secured as far as possible from the influence of the water, and expose the joint as much as possible to the action of the heat, and for this purpose the projection *b* is made at the lower end of the distributer to receive the cap. So soon as this cap becomes heated to the previously-determined degree the material which secures it in place will fuse, thus freeing the cap from its connection, and the pressure within the pipes will force the cap off the distributer, and thereby allow the water to flow freely through the said distributer.

On examination of the drawing, it will be apparent that the distributer is secured to the branch pipe A, the diameter of which is much less than the main pipe.

D is the valve, arranged within the chamber E to fit upon the seat F in substantially the usual manner, with the spindle G running out through the stuffing-box; also, in the usual manner, upon the under side of the valve is a cylindrical guide, L, which nearly fills the opening through the valve-seat. N is the inlet through which the water or other fluid enters; and in order to hold the valve at rest upon its seat—that is, to balance the valve—a slight opening, *a*, is made through the valve, which will allow the water to flow through and fill the chamber E on the back of the valve; hence so long as the distributer is closed the valve must also remain closed; but as soon as the cap is thrown off the pressure upon the back of the valve will be removed, and the valve will open to allow the free flow of the water.

To sound the alarm, (here represented by a steam-whistle actuated through the valve-stem P,) a considerable motion of the valve-spindle G is necessary, more than would naturally be given by the opening of the valve. By the addition of the cylinder L of the valve, the passage cannot be fully open until this part L of the valve has passed back or above the seat; hence there must be given to the valve an additional movement, according to the length of the part L, and this is sufficient to give the required movement for the alarm.

I do not broadly claim a cap secured over an outlet, to be destroyed or liberated therefrom by heat, being aware that this is not new; but,

Having thus fully described my invention, I claim as new and desire to secure by Letters Patent—

1. The combination, with a distributer arranged to spread the water or other fluid over a large area, of the metal cap C, arranged to cover and protect the distributer, substantially as and for the purpose set forth.

2. In an automatic fire-extinguisher, the combination, with a distributer provided with an extended base, of a metal cap arranged to fit the distributer above the base and secured to the same by a low fusible material, substantially as and for the purpose set forth.

3. The combination, with the fluid-supply channel or conduit of the branch pipe A, smaller than the conduit to which it is secured, a distributer arranged to spread the fluid and provided with an extended base, of a metal cap arranged to cover the distributer, substantially as and for the purpose set forth.

4. In a fire-extinguisher, the combination, with the fluid-supply pipe or conduit, of a distributer arranged to spread the fluid, a cap to fit over and protect the distributer, and a valve arranged to shut off or let on the fluid-supply, substantially as and for the purpose set forth.

5. In combination with the distributer B, provided with a contracted neck and extended base *b*, the cap C, secured to the said base by a fusible material, substantially as and for the purpose set forth.

6. In combination with an alarm, an elongated valve, L, extending through the valve-opening, whereby the passage closed by said valve is not opened until the valve shall have been moved its length and the alarm sounded.

7. The combination, with the valve D, provided with the opening *a*, of a cylindrical extension nearly filling the valve-opening, arranged to move through a fixed distance before the free discharge is opened, substantially as and for the purpose set forth.

HENRY S. PARMELEE.

Witnesses:

JOSEPH A. MILLER,
JAMES G. CLARK.